(12) United States Patent
Lin et al.

(10) Patent No.: US 8,573,786 B2
(45) Date of Patent: Nov. 5, 2013

(54) PROJECTOR APPARATUS AND METHOD FOR DYNAMICALLY MASKING OBJECTS

(75) Inventors: Guo-Yau Lin, Fairport, NY (US); Issac Feldstein Case, Fairport, NY (US); James Michael Sanchez, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 302 days.

(21) Appl. No.: 12/857,898

(22) Filed: Aug. 17, 2010

(65) Prior Publication Data
US 2012/0044421 A1 Feb. 23, 2012

(51) Int. Cl.
G03B 21/14 (2006.01)
G03B 21/26 (2006.01)
H04N 9/74 (2006.01)

(52) U.S. Cl.
USPC ............................. 353/97; 353/28; 348/590

(58) Field of Classification Search
USPC ................. 353/97, 28, 69, 70, 30, 121, 122; 348/586, 590, 607
See application file for complete search history.

(56) References Cited

U.S. PATENT DOCUMENTS

| 5,196,926 A | 3/1993 | Lee | |
|---|---|---|---|
| 2004/0165154 A1* | 8/2004 | Kobori et al. | 353/69 |
| 2005/0213053 A1* | 9/2005 | Childers | 353/99 |

* cited by examiner

*Primary Examiner* — William C Dowling
*Assistant Examiner* — Ryan Howard
(74) *Attorney, Agent, or Firm* — Fox Rothschild LLP

(57) ABSTRACT

A projector for masking out one or more objects between the projector and a screen. The projector includes an image capture sensor configured to produce a captured screen image. The projector further includes a processing device configured to receive a video-in signal, create a masking image that corresponds to at least a portion of the captured screen image, and produce a video-out signal, wherein the video-out signal comprises a combination of the video-in signal and the masking image. A panel controller in the projector receives the video-out signal and causes at least one or more pixels of at least one panel to be closed based upon the masking image such that any objects positioned between the projector and the screen are masked from any light projected by the projector.

11 Claims, 5 Drawing Sheets

US 8,573,786 B2

PROJECTOR APPARATUS AND METHOD FOR DYNAMICALLY MASKING OBJECTS

BACKGROUND

The present disclosure relates to a projector. More specifically, the present disclosure relates to a presentation projector that dynamically masks out one or more objects positioned between the projector and a screen.

During a typical office presentation, a digital data file such as a slideshow may be loaded onto a computing device and displayed on a screen via a projector. FIG. 1 illustrates an exemplary projector 100 projecting a presentation onto a screen 102. The projector 100 receives a video-in signal 104. The video-in signal 104 is processed by a liquid crystal display (LCD) panel controller 106. In a typical LCD projector, three LCD panels 108 are used, one each for projecting the colors red, blue and green. By opening or closing each pixel on the LCD panels 108, a variety of colors may be projected for each pixel by combining the outputs of the various LCD panels 108. Based upon the video-in signal 104, the LCD panel controller 106 determines the state of each pixel (i.e., opened or closed) for every pixel in the LCD panels 108. The LCD panel controller 106 transmits a control signal to the LCD panels 108 indicating the state (i.e., open or closed) for each pixel in the panel. A lamp 110 projects a strong beam of light through each of the LCD panels 108. The lamp 110 may be a high intensity lamp such as a metal halide lamp or other similar lamp. After the light emitted by the lamp 110 passes through the LCD panels 108, the light passes through one or more lenses 112, and the projected light 114 is directed by the lenses toward the screen 102.

The projector 100 may be a portable device placed on a desk or table at a low enough level that the light emitted from the projector may be projected at eye level of a person 116 walking in front of the projector. The person 116 walking in front of the projector may experience discomfort due to bright light shining in their eyes. Audience members may be distracted by the images projected onto the person 116 walking in front of the projector, as well as the shadow 117 cast by the person on the screen 102.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this document is to be construed as an admission that the embodiments described in this document are not entitled to antedate such disclosure by virtue of prior invention. As used in this document, the term "comprising" means "including, but not limited to."

In one general respect, the embodiments disclose a projector for masking out one or more objects between the projector and a screen. The projector includes an image capture sensor configured to capture an image of a screen to produce a captured screen image; a processing device operably connected to the image capture sensor and configured to receive a video-in signal, create a masking image that corresponds to at least a portion of the captured screen image, and produce a video-out signal, wherein the video-out signal comprises a combination of the video-in signal and the masking image; a panel controller operably connected to the processing device and configured to receive the video-out signal; and at least one panel operably connected to the panel controller and comprising a plurality of pixels. The panel controller is further configured to cause one or more pixels of the at least one panel to be closed based upon the masking image.

In another general respect, the embodiments disclose a system for masking out one or more objects in front of a projector. The system includes a computing device and a projector. The computing device includes an image capture sensor configured to capture an image of a screen to produce a captured screen image, and a processing device operably connected to the image capture sensor and configured to receive a video-in signal, create a masking image that corresponds to at least a portion of the captured screen image, and produce a video-out signal, wherein the video-out signal comprises a combination of the video-in signal and the masking image. The projector is connected to the computing device and configured to project the video-out signal onto the screen.

In another general respect, the embodiments disclose a method of projecting an image. The method includes capturing, by an image capture sensor, at least one captured screen image; creating, by a processing device, a video-out signal; and projecting, by a projector operably connected to the processing device, the video-out signal onto a screen. The video-out signal comprises at least a portion of a video-in signal received from a video source, and one or more masked pixels determined based upon at least a portion of the captured screen image.

DETAILED DESCRIPTION

For purposes of the discussion below, a "projector" refers to a device configured to display video, images or computer data on a screen or other surface. A projector may be further configured to emit sound corresponding to the displayed video, images or data. An exemplary projector may include a liquid crystal display (LCD) projector as discussed herein. An example of a typical LCD projector, and the accompanying optical system, is described in U.S. Pat. No. 5,196,926 to Lee, the content of which is hereby incorporated by reference. However, other projectors may also be used within the scope of this invention.

A "screen" refers to a surface suitable for displaying any video, images or computer data projected by a projector. A screen may be a permanent fixture such as a wall, or a portable device such as a folding or rolling fabric screen.

Figure 2:
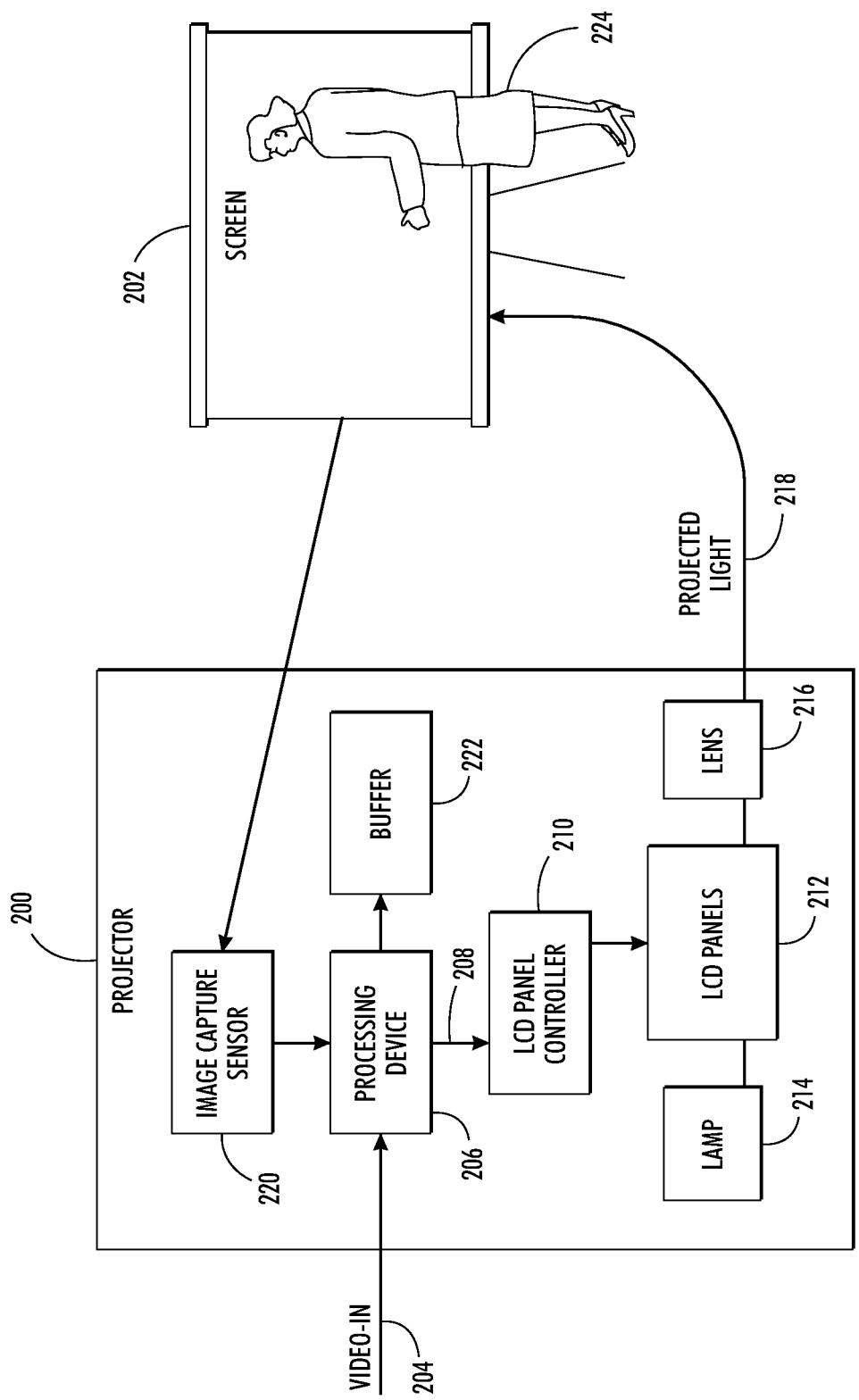
FIG. 2 illustrates an exemplary projector according to an embodiment.

FIG. 2 illustrates an exemplary projector 200 for projecting video, images, or computer data on a screen 202 according to an embodiment. The projector 200 may include additional circuitry that masks out any person or object standing between the projector and the screen 202 such that the light emitted from the projector does not cause the person discomfort. As used herein, "an object" refers to one or more obstructions between a projector and a screen that prevents any projected light from the projector reaching the screen.

Figure 1:
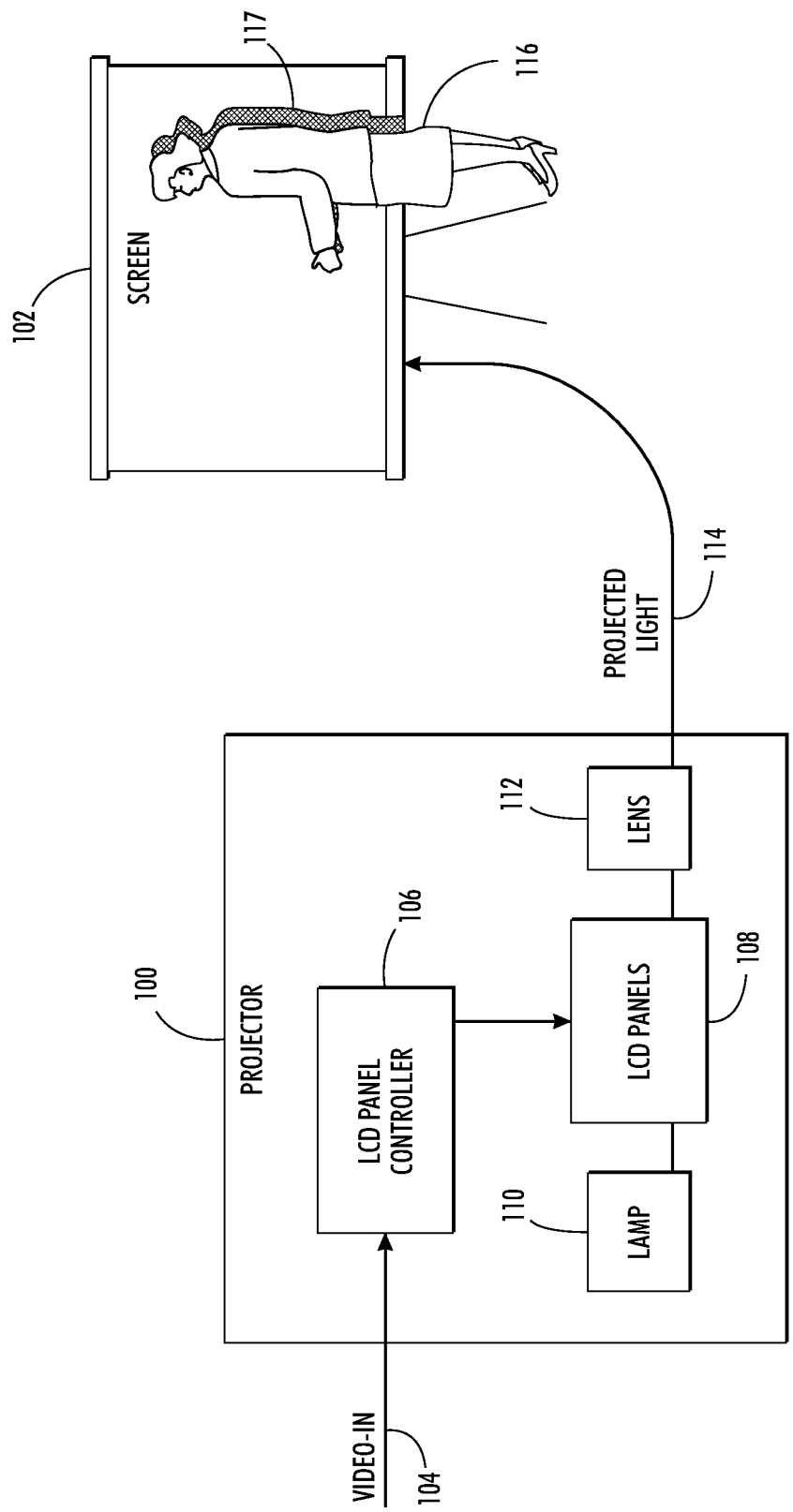
FIG. 1 illustrates an exemplary projector.

Like the projector 100 in FIG. 1, the projector 200 may receive a video-in signal 204. The video-in signal 204 may be received from a computer (e.g., a laptop computer or a desktop computer), a video player (e.g., a DVD or Blu-Ray® disc player), or other device capable of producing the video-in signal. The video-in signal 204 may be received by a processing device 206. The processing device 206 may be a graphics processing unit (GPU), a central processing unit (CPU), or another device capable of receiving and processing the incoming video-in signal 204. The processing device 206 may process the video-in signal 204 and transmit a video-out signal 208 to an LCD panel controller 210.

The video-out signal 208 may be further processed by an LCD panel controller 210. In an embodiment, three LCD panels 212 may be used, one each for projecting red, blue and green, thereby producing a portion of an image to be projected. Each LCD panel 212 may include a grid of pixels. The size of each grid may vary depending on the output resolution of the projector 200 (e.g., 1920 by 1080 pixels). In a projector 200 having an output resolution of 1920 by 1080 pixels, each LCD panel 212 may have a pixel grid that is 1920 by 1080 pixels, for a total of 2,073,600 pixels per grid. By opening or closing each pixel on the LCD panels 212, the LCD panel controller 210 can control the output of that specific pixel. For example, if pixel (1, 1) is to be output as red, the LCD panel controller 210 transmits a control signal to the LCD panels 212, instructing the LCD panels to open pixel (1, 1) on the red LCD panel while closing pixel (1, 1) on each of the blue and green LCD panels. If pixel (1, 1) is not to output any color (e.g., project no light at all), each pixel (1, 1) in the LCD panels 212 is closed in response to the control signal transmitted by the LCD panel controller 210. Based upon the video-out signal 208 from the processing device 206, the LCD panel controller 210 may determine the state of each pixel (i.e., opened or closed) for each pixel in the LCD panels 212 and signal each LCD panel accordingly. A lamp 214 may project a strong beam of light through each of the LCD panels 212. The lamp 214 may be a high intensity lamp such as a metal halide lamp or other similar lamp. After the light emitted by the lamp 214 passes through the LCD panels 212, the light may pass through one or more lenses 216, and the projected light 218 may be directed by the lenses toward the screen 202. The lenses may be positioned within the projector 200 such that any light produced by the lamp 214 may be reflected and/or focused at the screen 202.

The projector 200 may also include an image capture sensor 220. The image capture sensor 220 may be a camera mounted on or integrated in the projector 200 and positioned to capture an image of the screen 202, as well as any people or other objects that may be blocking the screen. Capturing the image of the screen 202 as well as any people or other objects that may be blocking the screen may include opening and closing an aperture of the image capture sensor 220. When the aperture is opened, a camera sensor (e.g., a charge coupled device (CCD) sensor or a complementary metal-oxide-semiconductor (CMOS) sensor) takes an image of the screen 202 as well as any people or other objects that may be blocking the screen and converts the image to a digital data file.

For example, if a person 224 walks in front of the screen 202 while projector 200 is displaying an image on the screen, the image capture sensor 220 may capture an image of the screen as well as the person. This captured image may be passed to the processing device 206. The processing device 206 may determine the exact location of the person 224 in the captured image by comparing the captured image against the previously transmitted video-out signal 208. For example, the processing device 206 may determine what pixels have changed in color or intensity, or it may determine what pixels do not correspond to a color of the screen.

Based upon the location of the person 224, the processing device 206 may create a masking image. The masking image may be overlaid on the video-in signal 204, thereby masking the pixels being displayed that correspond to the position of the person 224 in the captured image. The LCD panel controller 210 may receive an updated video-out signal 208 including the masking image overlaid over the video-in signal 204, and mask the pixels included in the area of the video-in signal covered by the masking image by signaling the LCD panels 212 to close the corresponding pixels in each of the LCD panels.

The projector 200 may further include a memory device or buffer 222. The buffer may be a solid state memory module such as a RAM module, a high transfer speed hard drive, or other data storage device capable of storing the data produced by the processing device 206. The buffer 222 may be configured to store various data, such as the capture image, the masking image, the video-in signal 204, and the previously sent video-out signal 208.

Figure 3:
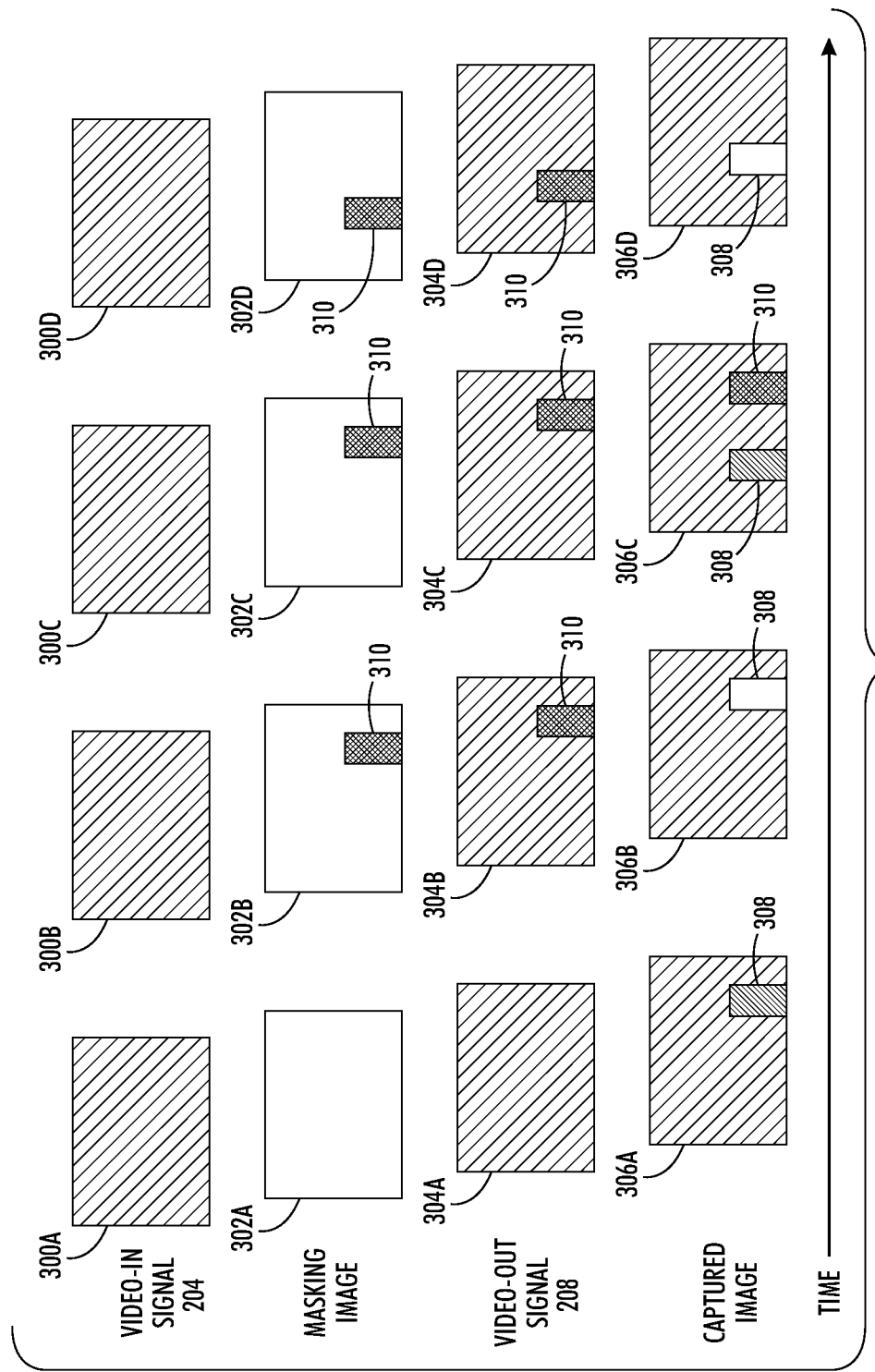
FIG. 3 illustrates various views of exemplary screen images according to an embodiment.

FIG. 3 illustrates an exemplary set of screenshots of the various images discussed above in regard to FIG. 2, specifically the video-in signal 204, the masking image, the video-out signal 208, and the capture image. The top row of screenshots 300 A-300 D may represent various screenshots of the video-in signal 204. It should be noted that while the screenshots 300 A-300 D show the same image, the images may change between screenshots. The second row of screenshots 302 A-302 D may represent various screenshots of the masking image. The third row of screenshots 304 A-304 D may represent various screenshots of the video-out signal 208. The bottom row of screenshots 306 A-306 D may represent various screenshots of the captured image. Each column of screenshots (e.g., the A column, the B column, etc.) represents a single set of screenshots associated with a single time period. The time period may be determined based upon the processing resources available. For example, the projector 200 may normally update the image at 60 HZ. However, with the addition of the image capture and masking, and the associated processing required for each image, the refresh rate may be reduced to, for example, 10 HZ.

In the A column, the initial video-in signal 204 screenshot 300 A may be received by the processing device 206. As there is no capture image yet to refer to, the masking image screenshot 302 A is blank, i.e., there is no object to mask. The video-out signal 208 screenshot 304 A may be identical to screenshot 300 A because the masking image is blank. The image capture screenshot 306 A may include an object 308 between the projector 200 and the screen 202. As discussed above, the object 308 may be in the direct path of the projected light 218 from the projector 200. In the next time period, the object 308 may be masked out of the video-out signal 208.

In the B column, a second time period is illustrated. The video-in signal 204 screenshot 300 B may be received by the processing device 206. The processing device 206 may then compare the previous video-out signal 208 screenshot 304 A and the captured image screenshot 306 A to identify objects between the projector 200 and the screen 202. In this case, the processing device 206 may create a masking image, such as screenshot 302 B, to mask the object 308. In the screenshot 302 B, the position of the object 308 is replaced with an array 310 of closed pixels such that no light is projected through those pixels. The processing device 206 may then combine the video-in signal 204 screenshot 300 B and the masking image screenshot 302 B to create an updated video-out signal 208 screenshot 304 B, including the array 310 of closed pixels. As such, the updated video-out signal 208 is transferred to the LCD panel controller 210. The LCD panel controller 210 determines which pixels are to be closed and transmits a signal to the LCD panels 212 closing those pixels on each of the LCD panels, thereby eliminating light being emitted from those pixels and, thus the light emitted from the projector 200 onto the object 308. The image capture screenshot 306 B may still include the object 308 between the projector 200 and the screen 202.

In the C column, a third time period is illustrated. The video-in signal 204 screenshot 300 C may be received by the processing device 206. The processing device 206 may then compare the previous video-out signal 208 screenshot 304 B and the captured image screenshot 306 B to determine whether any objects between the projector 200 and the screen 202, and/or whether any previously detected objects have moved. If one or more objects are present, or a previously detected object has moved, the processing device 206 may create an updated masking image. However, because object 308 did not move, the previously used masking image 302 B may be used again by the processing device to mask the object. The processing device 206 may then combine the video-in signal 204 screenshot 300 C and the masking image screenshot 302 C to create an updated video-out signal 208 screenshot 304 C, including the array 310 of closed pixels. The image capture screenshot 306 C may still include the object 308 between the projector 200 and the screen 202, however, the object 308 may have moved to another position between the projector and the screen, thus resulting in the array 310 of closed pixels being positioned in an area away from the object.

In the D column, a fourth time period is illustrated. The video-in signal 204 screenshot 300 D may be received by the processing device 206. The processing device 206 may compare the previous video-out signal 208 screenshot 304 C and the captured image screenshot 306 C to determine whether any objects between the projector 200 and the screen 202, and/or whether any previously detected objects have moved, such as object 308. If one or more objects are present, or a previously detected object has moved, the processing device 206 may create an updated masking image. Because object 308 is located in a different position in screenshot 306 C, the processing device 206 may create an updated masking image screenshot 302 D moving the array 310 of closed pixels to the location of object 308 in captured image screenshot 306 C. The processing device 206 may then combine the video-in signal 204 screenshot 300 D and the masking image screenshot 302 D to create an updated video-out signal 208 screenshot 304 D, including the array 310 of closed pixels. As such, the updated video-out signal 208 may eliminate the light emitted from the projector 200 onto the object 308. The image capture screenshot 306 D may still include the object 308 between the projector 200 and the screen 202. The above discussed process may continue throughout the duration of a presentation or other use of the projector 200.

Figure 4:
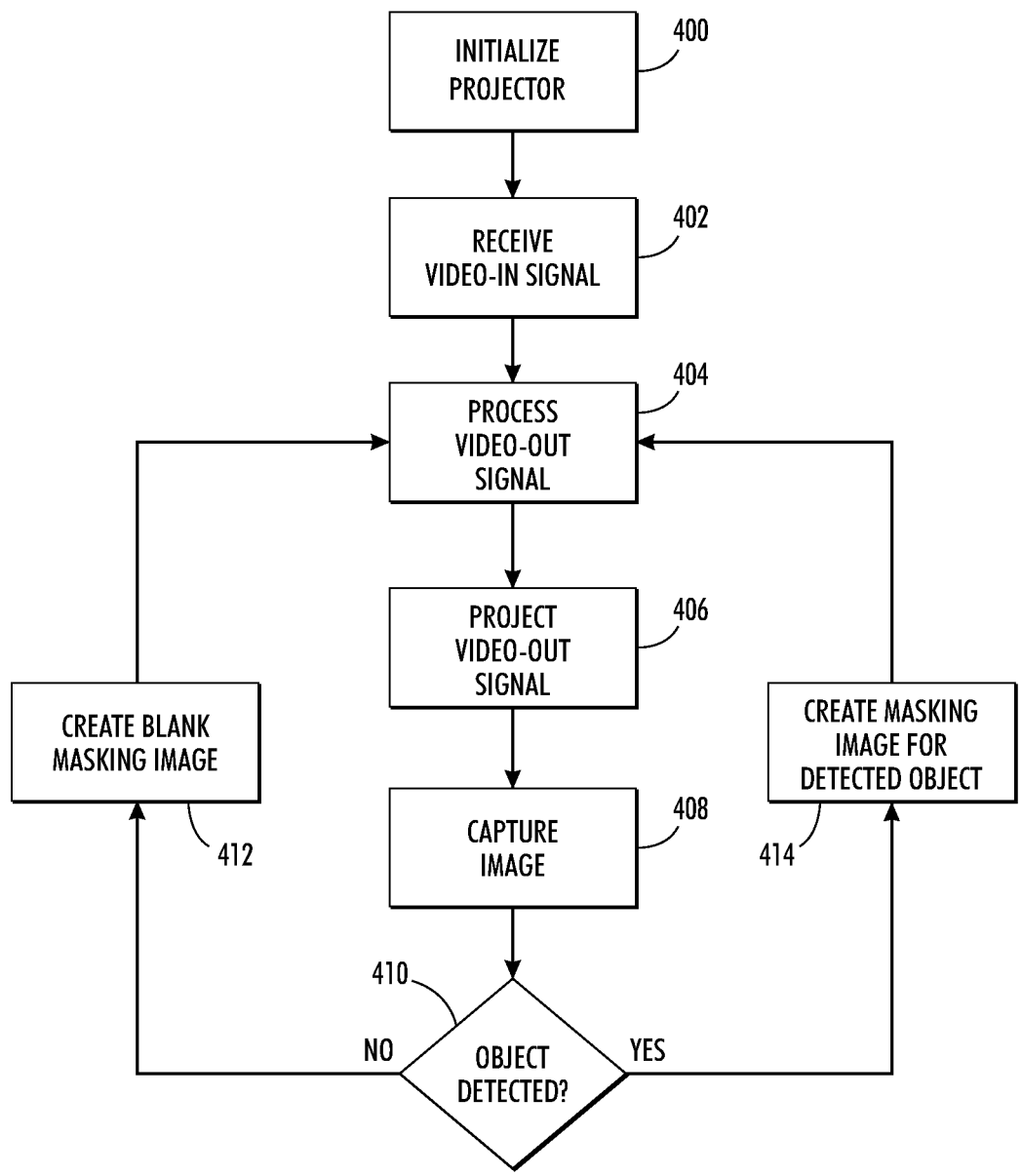
FIG. 4 illustrates various embodiments of a projection and masking process according to an embodiment.

FIG. 4 illustrates a flow chart outlining an exemplary process for detecting an object and masking out the object as discussed above in regard to FIG. 3. A projector (e.g., projector 200) may be initialized 400. During initialization 400, a lamp in the projector may warm up, a lens may be focused based upon a distance between the projector and a screen, and an image capture sensor may be initialized. During the initialization of the image capture sensor, am image of the screen may be taken, and the image capture sensor may be adjusted such that the image taken is aligned with the screen position. After initialization 400, the projector may receive 402 a video-in signal (e.g., video-in signal 204). The video-in signal may be processed 404 by a processing device (e.g., processing device 206) such that a video-out signal (e.g., video-out signal 208) is created. The projector may project 406 the video-out signal onto the screen. During projection, the image capture sensor may capture 408 an image of the screen. The captured 408 image may be analyzed by the processing device to determine 410 whether an object is located between the projector and the screen.

Determining 410 whether an object is located between the projector and the screen may be performed in several manners. One exemplary approach may be to analyze the color of each pixel in the captured image against the color of the corresponding pixel in the projected image. If the color difference is sufficient, it may indicate that an object is located between the projector and the screen. For example, a threshold may define an acceptable color difference in corresponding pixel values between the captured image and the projected image to account for common interference caused by lighting, light absorbed by the screen, any dust/particulate in the air, and any other issues that may cause a slight discoloration of the projected image. If the projector is capable of projecting 24 bit color, or at least 16,777,216 color variations, each pixel in the projected image may have a color value between 0 (black) and 16,777,215 (white). If the difference in color value for any pixel in the captured image is greater than the threshold value, an object may be interfering with that pixel. To continue the above example, a group of pixels in the projected image may have the color value 16,777,215 (white). In the captured image, the corresponding pixels may have the color value 12,345,678. This difference in the pixel color values may indicate an object is located between the projector and the screen.

If the processing device determines 410 that no object is located between the projector and the screen, a blank masking image may be created 412. The processing device may apply the blank masking image to the video-in signal during processing 404, thereby resulting in a video-out signal that is unaltered from the video-in signal being projected 406. If the processing device determines 410 an object is located between the projector and the screen, a masking image identifying the pixels of the projected image that coincide with the location of the object may be created 414. The processing device may apply the masking image to the video-in signal during processing 404, thereby resulting in an altered video-out signal being projected 406. In particular, any pixels on the LCD panels of the projector corresponding to the location of the object may be closed, resulting in no light being projected at the object.

After the updated video-out signal is projected 406, a new image may be captured 408 and the object detection process may repeat until the projector has completed displaying the video-in signal. It should be noted that the process outlined in FIG. 4 is shown by way of example only. Additional techniques may be used to determine whether an object is located between the projector and the screen such as motion detection, sonar, facial recognition software used to detect whether a person has walked in front of the projector, and the like.

Figure 5:
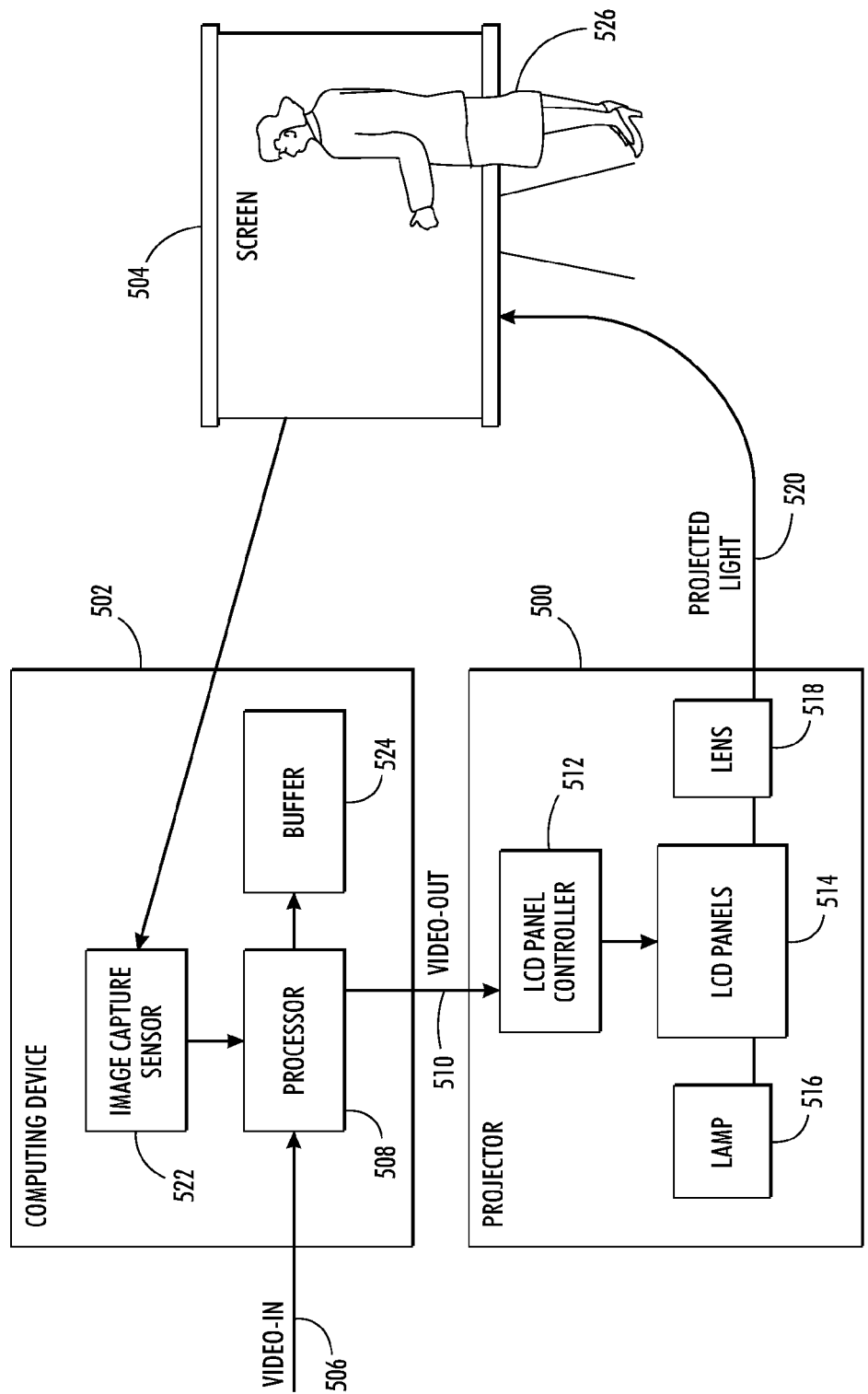
FIG. 5 illustrates an alternative exemplary projector according to an embodiment.

FIG. 5 illustrates an alternative projector 500 for use in combination with an external computing device 502. In this embodiment, the computing device 502 may handle the image capture, masking, and video in/out processing. This may provide an alternative to a single projector having the computing power to perform the same functions, thereby allowing the computing device 502 to be used with any projector to perform object detection and masking. The computing device 502 may also be able to handle more resource intensive processes, such as motion detection, sonar, and/or facial recognition as mentioned above. The computing device may receive a video-in signal 506, process the video-in signal as discussed above to produce a video-out signal 510. The projector 500 may project the video-out signal onto a screen 504.

A processing device 508 of the computing device 502 may receive the video-in signal 506. As before, the processing device 508 may apply a masking image to the video-in signal 506 to produce the video-out signal 510. The processing device may pass the video-out signal to an LCD panel controller 512 of the projector 500. The LCD panel controller 512 may determine the state of each pixel (i.e., opened or closed) for each pixel in one or more LCD panels 514. A lamp 516 may project a strong beam of light through each of the LCD panels 514. The lamp 516 may be a high intensity lamp such as a metal halide lamp or other similar lamp. After the light emitted by the lamp 516 passes through the LCD panels 514, the light may be focused via one or more lenses 518, and the focused light 520 may be directed by the lenses toward the screen 504.

The computing device 502 may also include an image capture sensor 522. The image capture sensor 522 may be a camera mounted on or integrated with the computing device 502 and positioned to capture an image of the screen 504, as well as any people or other objects that may be located between the projector 500 and the screen. For example, if a person 526 walks in front of the screen 504 while the projector 500 is displaying an image on the screen, the image capture sensor 522 may capture an image of the screen as well as the person. This captured image may be passed to the processing device 508. As discussed above in regard to FIG. 4, the processing device 508 may determine the exact location of the person 526 in the capture image, and may create a masking image. The masking image may be combined with the video-in signal 506, thereby masking the pixels corresponding to the position of the person 526. The computing device 502 may further include a memory device or buffer 524. The buffer may be a solid state memory module such as a RAM module, a high transfer speed hard drive, or other data storage device capable of storing the data produced by the processing device 508. The buffer 524 may be configured to store various data, such as the masking image, the video-in signal 506, and/or the video-out signal 510. The processing device 508 may retrieve one or more pieces of data from the buffer, such as the masking image, to create an updated video-out signal 510.

It should be noted that the above descriptions of FIGS. 1-5 are provided by way of example only, and additional embodiments or alternatives may be included. For example, the masking image may include a level of transparency depending on, for example and without limitation, a preference of a user operating the projector or computing device. The masking image may not simply black out any pixels corresponding to the position of an object. Rather, the masking image may merely dim the light emitted from those pixels to a lower or less intense level. Similarly, the projector and/or computing device may take the environment around the screen into account when determining the presence of an object and masking out the object. For example, depending on the light levels around the screen, the transparency level of the masking image may be increased or reduced accordingly.

In another example, a feathering effect may be applied around the masked area in the video-out signal. The feathering effect may apply a transparency value at or near the edges of the object to be masked, blending the projected content and the object to be masked defining a more smooth transition between the projected content and the masked object. Thus, the feathering effect may be incorporated into the video-out signal to reduce any harsh transition between the projected content and the masked object.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A projector for masking out one or more objects between the projector and a screen comprising:
   an image capture sensor configured to capture an image of a screen to produce a captured screen image;
   a processing device operably connected to the image capture sensor and configured to:
      receive a video-in signal,
      create a masking image that corresponds to at least a portion of the captured screen image, wherein creating the masking image comprises:
         determining whether the captured screen image includes an image of at least one object positioned between the projector and the screen, wherein determining whether the captured screen image includes an image of at least one object positioned between the projector and the screen comprises:
            comparing each pixel of the captured screen image against each corresponding pixel of a previously transmitted video-out signal,
            determining if a color difference for each compared pixel in the captured screen image is within an acceptable difference threshold, and
            for each compared pixel in the captured screen image that exceeds the acceptable difference threshold, assigning that pixel as corresponding to an area of the captured screen occupied by the at least one object, and
         in response to determining that the captured screen image includes an image of at least one object positioned between the projector and the screen, creating the masking image to close one or more pixels corresponding to the area of the captured screen image occupied by the image of the at least one object such that no light is projected at the object, and
      produce a video-out signal, wherein the video-out signal comprises a combination of the video-in signal and the masking image; and
   a panel controller operably connected to the processing device and at least one panel comprising a plurality of pixels, the panel controller configured to:
      receive the video-out signal,
      determine a state of each pixel in the video-out signal, wherein the state of each pixel is either on or off, and
      provide a signal to each of the plurality of pixels in the at least one panel to either open or close, thereby creating an updated video-out signal including an array of closed pixels corresponding to the area of the captured screen image occupied by the at least one object.

2. The projector of claim 1, wherein the masking image created by the processing device comprises a blank masking image in response to determining that the captured screen image does not include an image of at least one object positioned between the projector and the screen.

3. The projector of claim 1, wherein the video-out signal further comprises a transparency value applied around one or more edges of the masking image to produce a feathering effect.

4. The projector of claim 1, wherein the at least one panel is a liquid crystal display panel.

5. A system for masking out one or more objects in front of a projector comprising:
a computing device comprising:
an image capture sensor configured to capture an image of a screen to produce a captured screen image, and
a processing device operably connected to the image capture sensor and configured to:
receive a video-in signal,
create a masking image that corresponds to at least a portion of the captured screen image, wherein creating the masking image comprises:
determining whether the captured screen image includes an image of at least one object positioned between the projector and the screen, wherein determining whether the captured screen image includes an image of at least one object positioned between the projector and the screen comprises:
comparing each pixel of the captured screen image against each corresponding pixel of a previously transmitted video-out signal,
determining if a color difference for each compared pixel in the captured screen image is within an acceptable difference threshold, and
for each compared pixel in the captured screen image that exceeds the acceptable difference threshold, assigning that pixel as corresponding to an area of the captured screen occupied by the at least one object, and
in response to determining that the captured screen image includes an image of at least one object positioned between the projector and the screen, creating the masking image to close one or more pixels corresponding to the area of the captured screen image occupied by the image of the at least one object such that no light is projected at the object, and
produce a video-out signal, wherein the video-out signal comprises a combination of the video-in signal and the masking image, and
a projector operably connected to the computing device and configured to project the video-out signal onto the screen, wherein the projector comprises:
a panel controller,
at least one panel operably connected to the panel controller and comprising a plurality of pixels, and
at least one lens positioned to focus an image based on the video-out signal to be projected onto a screen, wherein the panel controller is configured to:
receive the video-out signal,
determine a state of each pixel in the video-out signal, wherein the state of each pixel is either on or off, and
transmit a signal to each of the plurality of pixels in the at least one panel to either open or close, thereby creating an updated video-out signal including an array of closed pixels corresponding to the area of the captured screen image occupied by the at least one object.

6. The system of claim 5, wherein the masking image created by the processing device comprises a blank masking image in response to determining that the captured screen image does not include an image of at least one object positioned between the projector and the screen.

7. The system of claim 5, wherein the video-out signal further comprises a transparency value applied around one or more edges of the masking image to produce a feathering effect.

8. The system of claim 5, wherein the at least one panel is a liquid crystal display panel.

9. A method of projecting an image comprising:
capturing, by an image capture sensor, at least one captured screen image;
determining, by a processing device, whether the captured screen image includes an image of at least one object positioned between the projector and the screen, wherein determining whether the captured screen image includes an image of at least one object positioned between the projector and the screen comprises:
comparing each pixel of the captured screen image against each corresponding pixel of a previously transmitted video-out signal,
determining if a color difference for each compared pixel in the captured screen image is within an acceptable difference threshold, and
for each compared pixel in the captured screen image that exceeds the acceptable difference threshold, assigning that pixel as corresponding to an area of the captured screen occupied by the at least one object;
in response to determining that the captured screen image includes an image of at least one object positioned between the projector and the screen, creating, by the processing device, a masking image to close one or more pixels corresponding to the area of the captured screen image occupied by the image of the at least one object such that no light is projected at the object,
creating, by the processing device, a video-out signal, wherein the video out signal comprises:
at least a portion of a video-in signal received from a video source, and
the masking image; and
projecting, by a projector operably connected to the processing device, the video-out signal onto a screen, wherein projecting comprises:
determining, by a panel controller operably connected to the processing device, the position of any masked pixels in the video-out signal, and
transmitting, by the panel controller, a signal to each of the plurality of pixels in the at least one panel to either open or close, thereby creating an updated video-out signal including an array of closed pixels corresponding to the area of the captured screen image occupied by the at least one object.

10. The method of claim 9, wherein creating the masking image comprises creating a blank masking image in response to determining that the captured screen image does not include an image of at least one object positioned between the projector and the screen.

11. The method of claim 9, wherein the video-out signal further comprises a transparency value applied around one or more edges of the masking image to produce a feathering effect.

* * * * *